APPARATUS AND METHOD FOR COMPARING RECORDED INFORMATION

Filed Dec. 8, 1954 9 Sheets-Sheet 1

INVENTORS
E. M. S. McWHIRTER
S. B. OST
BY
ATTORNEY

APPARATUS AND METHOD FOR COMPARING RECORDED INFORMATION
Filed Dec. 8, 1954 9 Sheets-Sheet 2
FIG. 2.
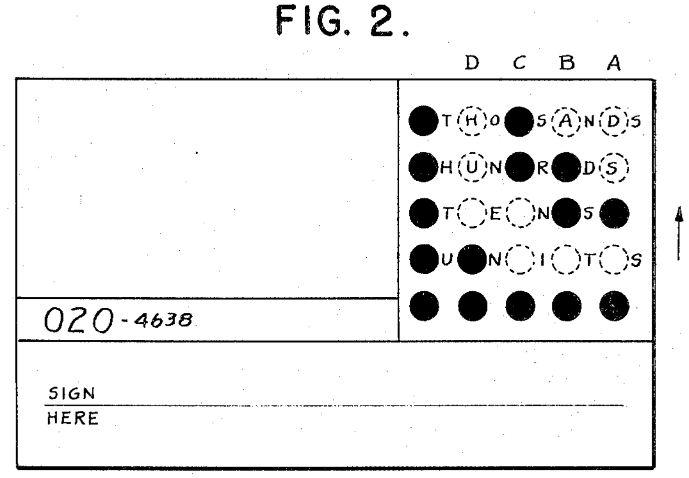
FIG. 3.
| | 0 | 1 | 2 | 3 | 4 | 5 | 6 | 7 | 8 | 9 | STOP |
|---|---|---|---|---|---|---|---|---|---|---|---|
| A | 0 | 1 | 0 | 1 | 0 | 1 | 0 | 1 | 0 | 1 | 1 |
| B | 0 | 0 | 1 | 1 | 0 | 0 | 1 | 1 | 0 | 0 | 1 |
| C | 0 | 0 | 0 | 0 | 1 | 1 | 1 | 1 | 0 | 0 | 1 |
| D | 0 | 0 | 0 | 0 | 0 | 0 | 0 | 0 | 1 | 1 | 1 |
FIG. 4.
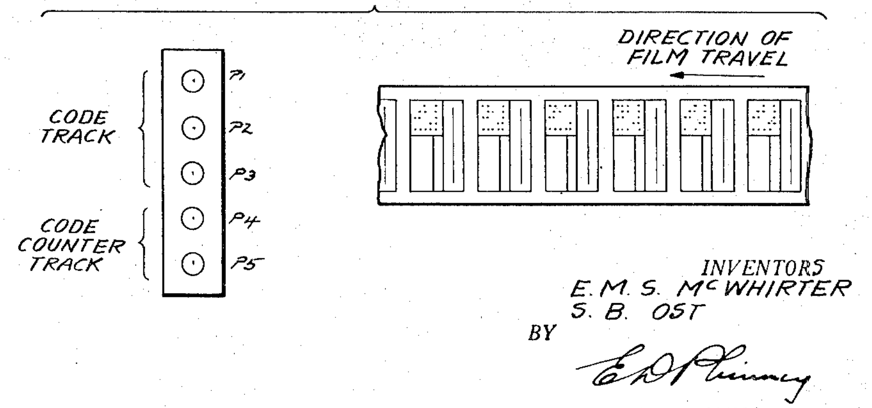
INVENTORS
E. M. S. McWHIRTER
S. B. OST
BY
[signature]
ATTORNEY

APPARATUS AND METHOD FOR COMPARING RECORDED INFORMATION

Filed Dec. 8, 1954 9 Sheets-Sheet 3

INVENTORS
E. M. S. Mc WHIRTER
S. B. OST
BY [signature]
ATTORNEY

March 12, 1957 E. M. S. McWHIRTER ET AL 2,785,388

APPARATUS AND METHOD FOR COMPARING RECORDED INFORMATION

Filed Dec. 8, 1954 9 Sheets-Sheet 4

INVENTORS
E. M. S. McWHIRTER
S. B. OST
BY [signature]
ATTORNEY

APPARATUS AND METHOD FOR COMPARING RECORDED INFORMATION
FIG. 8.
| | | | | | | | | | | | | | | | | | |
|---|---|---|---|---|---|---|---|---|---|---|---|---|---|---|---|---|---|
| | | 4 | | | | | | | | 6 | | | | | | | |
| | | 0 | | 0 | | 1 | | 0 | | 0 | | 1 | | 1 | | 0 | |
| BIAS PULSE | | N | | N | | P | | N | | N | | P | | P | | N | |
| | | C | M | C | M | C | M | C | M | C | M | C | M | C | M | C | M |
| RB | 1 | 1 | 1 | 1 | 1 | 1 | RA1 | 1 | 1 | 1 | 1 | 1 | RA1 | 1 | RA1 | 1 | 1 |
| | 2 | 2 | 2 | 2 | 2 | 2 | 2 | RA2 | RA2 | 2 | 2 | 2 | 2 | RA2 | RA2 | RA2 | RA2 |
| | 3 | 3 | 3 | 3 | 3 | 3 | 3 | 3 | 3 | RA3 | RA3 | 3 | 3 | 3 | 3 | RA3 | RA3 |
| | 4 | 4 | 4 | 4 | 4 | 4 | 4 | 4 | 4 | 4 | 4 | RA4 | RA4 | 4 | 4 | 4 | 4 |
| | 5 | 5 | 5 | 5 | 5 | 5 | 5 | 5 | 5 | 5 | 5 | 5 | 5 | RA5 | RA5 | 5 | 5 |
| | 6 | 6 | 6 | 6 | 6 | 6 | 6 | 6 | 6 | 6 | 6 | 6 | 6 | 6 | 6 | RA6 | RA6 |
| | 7 | 7 | 7 | 7 | 7 | 7 | 7 | 7 | 7 | 7 | 7 | 7 | 7 | 7 | 7 | 7 | 7 |
| | 8 | 8 | 8 | 8 | 8 | 8 | 8 | 8 | 8 | 8 | 8 | 8 | 8 | 8 | 8 | 8 | 8 |
| INTERVAL | 0 | 1 | 2 | 3 | 4 | 5 | 6 | 7 | 8 | 9 | 10 | 11 | 12 | 13 | 14 | 15 | 16 |
FIG. 11.
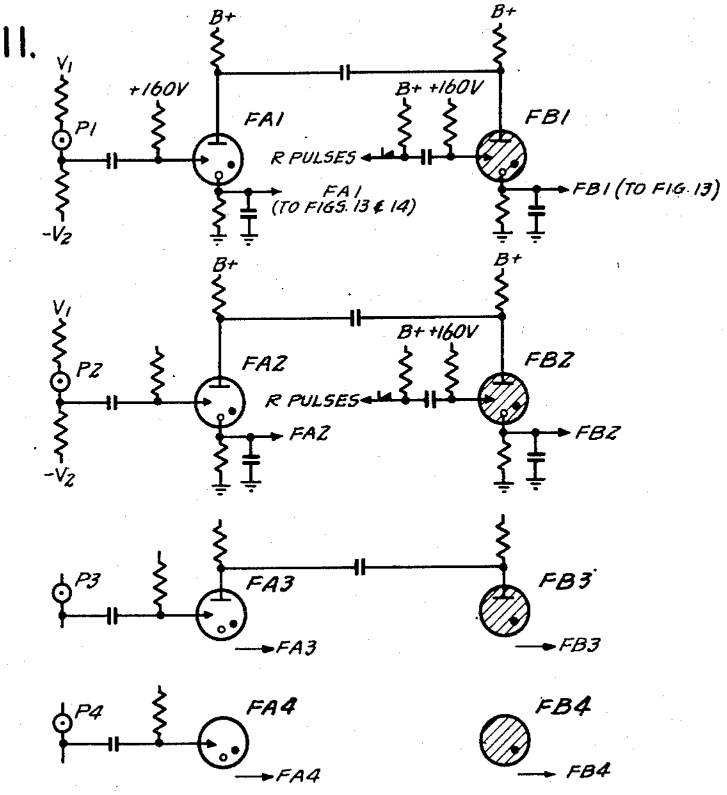
FIG. 12.
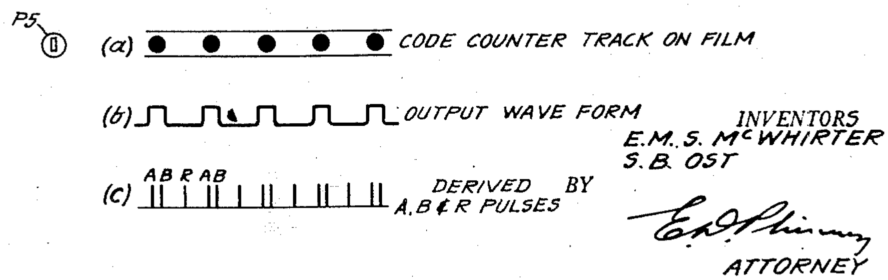
INVENTORS
E. M. S. McWHIRTER
S. B. OST
BY
[signature]
ATTORNEY INVENTORS
E. M. S. McWHIRTER
S. B. OST
BY
[signature]
ATTORNEY

APPARATUS AND METHOD FOR COMPARING RECORDED INFORMATION

Filed Dec. 8, 1954

9 Sheets-Sheet 7

INVENTORS
E. M. S. McWHIRTER
S. B. OST

BY [signature]

ATTORNEY

INVENTORS
E. M. S. McWHIRTER
S. B. OST
BY [signature]
ATTORNEY

INVENTORS
E.M.S. McWHIRTER
S. B. OST
BY [signature]
ATTORNEY 2,785,388

APPARATUS AND METHOD FOR COMPARING RECORDED INFORMATION

Eric Malcolm Swift McWhirter, Rye, and Stanley Benedict Ost, Brooklyn, N. Y., assignors to International Standard Electric Corporation, New York, N. Y., a corporation of Delaware Application December 8, 1954, Serial No. 473,972

14 Claims. (Cl. 340—149)

This invention relates to electronic systems for automatically selecting desired items of information from a multiplicity of items of recorded information.

While the invention may be adapted to a wide variety of business, scientific and philosophical applications, it is particularly applicable to, and will be described in connection with, a system which enables a rapid comparison of information contained on a document, such as a signature on a check, with a particular record or specimen automatically selected from a multiplicity of similar records or specimens.

According to one feature of the invention apparatus for selecting automatically a particular record from a multiplicity of similar records under control of a controlling member bearing coded indicia, comprises a film on which is photographed a multiplicity of similar records together with coded indicia particular to the respective records, a projector for the film including means for sequentially projecting such records on a screen, sensing means for reading the coded indicia on the controlling member, a first registering means actuated by the sensing means for recording the last-mentioned indicia, light sensitive means for scanning sequentially the coded indicia on the film, a second registering means actuated by such light-sensitive means for sequentially recording the coded indicia borne by said film, a comparing device for comparing the indicia recorded in the first registering means with the coded indicia recorded in turn in the second registering means, and means for stopping the film projector when correlation exists between the coded indicia recorded in the two registering means.

According to a further feature of the invention apparatus for enabling the correlation of information contained on a document with a particular one of a multiplicity of similar records, comprises a holder for the document provided with a track of magnetic material encoded with indicia particular to information borne by the document, a film on which is photographed a multiplicity of similar records together with coded indicia particular to the respective records, a projector including means for sequentially projecting the records upon a screen from the film, a reading head for scanning magnetically encoded indicia on the holder, first registering means actuated by the reading head for recording the indicia borne by the holder, light sensitive means for scanning sequentially the coded indicia on the film, second registering means actuated by such light sensitive means for sequentially recording the coded indicia borne by the film, comparing means for comparing the indicia recorded on the first registering means with the coded indicia recorded in turn in the second registering means, and means for stopping the film projector when correlation exists between the indicia recorded in the two registering means.

The above and other features of the invention will be more clearly understood from a consideration of the following detailed description taken in conjunction with the accompanying drawings in which Fig. 1 is a block diagram of a system according to one embodiment of our invention;

Fig. 2 shows a bank customer's account card;

Fig. 3 is a table showing the binary code used in representing the customer's account number on the account cards and on plastic jackets enclosing checks to be processed;

Fig. 4 shows a portion of a microfilm on which the customer's account cards are photographed in ascending order of account number and which also shows a read-out head consisting of five photocells;

Fig. 8 is a chart used to explain the operation of the shifting register of Fig. 6;

Fig. 11 is a circuit diagram of a film readout register into which the customer's account numbers on the film frames are read;

Fig. 12 is a wave form diagram showing the wave forms derived from the code counter track on the film;

In all the figures gas tubes in a normally fired condition are shown cross-hatched to indicate that condition.

Figure 1:
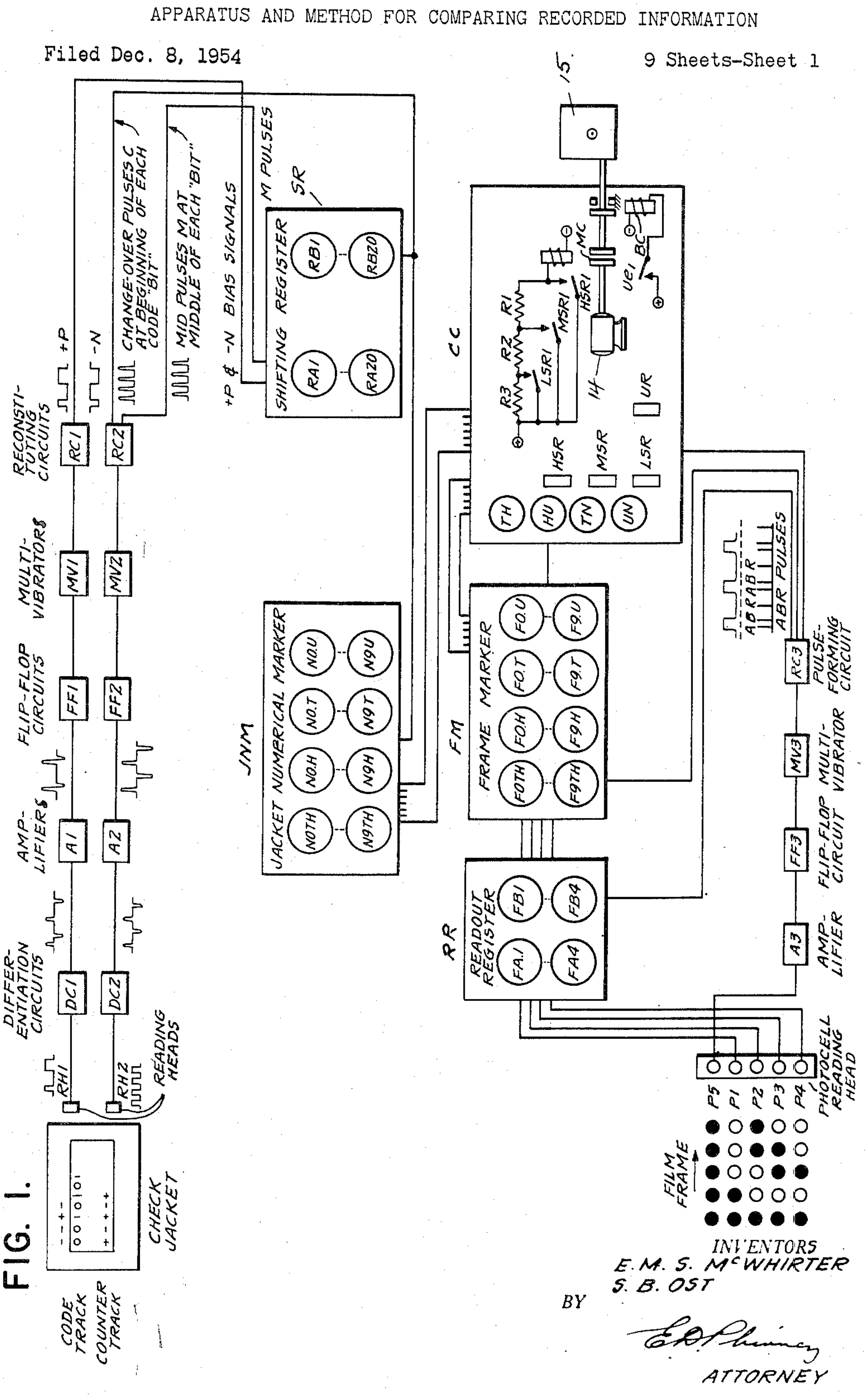

A general description of the system and its operation will first be given with reference to Fig. 1. A check, the signature on which is to be compared with the specimen signature on the customer's account card, is enclosed in a transparent plastic holder or jacket 1 having along its top edge a strip of magnetic material 2 encoded with customer's account number in the binary code, followed by a stop signal, and with a counter track from which is derived pulses used in the control of the electronic equipment. The signature account cards are pre-punched with the same binary code representing the particular customer's account number or with blacked-in circles according to the binary code. These cards are photographed in ascending numerical order on a microfilm which is run through a projector 15 with which is associated a photocell reading head PC. In the example chosen, each digit of the customer's four-digit account number is represented by a binary four element level, a fifth level comprises a stop signal, and fifth element in each level being used to derive counter and control signals used in the control of the electronic equipment.

Figures 5, 7:
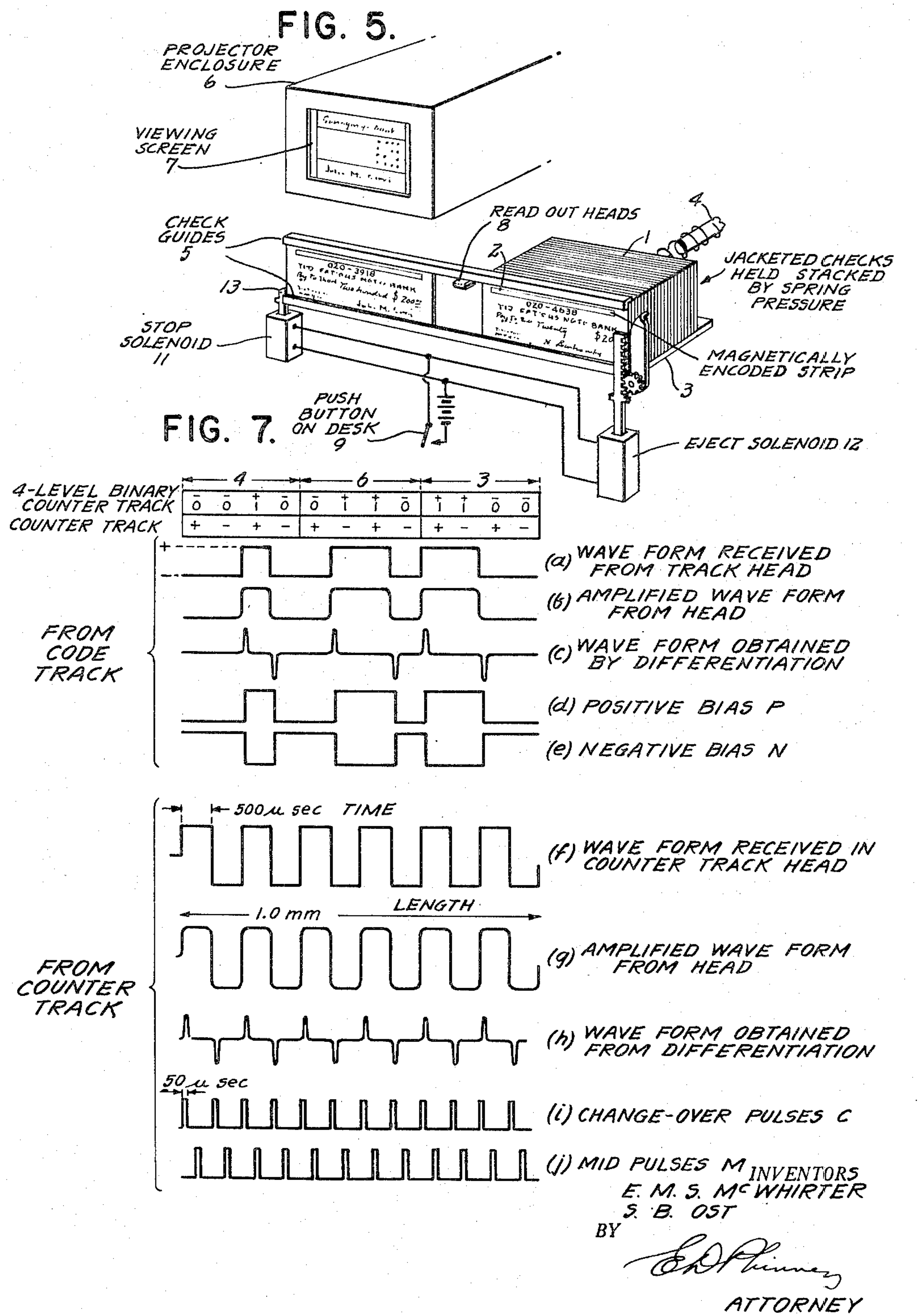
Fig. 5 illustrates the apparatus for handling the jacketed checks.
Fig. 7 is a wave form diagram showing the wave forms derived from the code and counter tracks on the jacket enclosing a check.

The code track on the check jacket 1 is scanned by a magnetic reading head RH1, the output of which is fed through a differentiating circuit DC1, an amplifier A1, a flip flop circuit FF1, a multi-vibrator MV1 and a reconstituting circuit RC1, to produce positive and negative bias signals +P and −N corresponding to the encoding on the magnetic strip 2 (see Fig. 7). The counter track on the strip 2 is scanned simultaneously by a second reading head RH2, the output of which is fed through similar circuits DC2, A2, FF2, MV2, RC2 to derive changeover pulses C at the beginning of each code "bit" and mid-pulses M at the middle of each code "bit." The positive and negative bias signals +P and −N together with the change-over pulses C and midpulses M are applied to a shifting register SR comprising two banks or columns of 20 gas tubes on which the four digits of the account number and the stop signal on the jacket 1 are recorded in binary form. When the stop signal is received by the register SR, the account number stored therein is transferred to a jacket numerical marker JNM where it is recorded in decimal form on four columns of 10 gas tubes NTH, NH, NT, NU. The receipt of the stop signal in the register SR also causes a control circuit CC to start a motor 14 to drive the film projector 15 at high speed to find the frame of the first account card the thousands digit of the account number of which is the same as the thousands digit of the account number of the jacketed check which is being processed.

The outputs from the four photocells P1 . . . P4 are fed to a readout register RR comprising two columns of 4 gas tubes FA, FB in which the four digits of the account number encoded on the first frame are successively read out in binary form and transferred and recorded in decimal form digit by digit in a frame marker FM comprising four columns of gas tubes FTH, FH, FT, FU, one for each digit.

The output of the fifth photocell P5 is passed through an amplifier A3, a flip flop circuit FF3, a multi-vibrator MV3 and a pulse forming circuit RC3 to derive three sets of timed pulses A, B and R which are used to control the operation of the control circuit CC, the readout register RR and the frame marker FM. The A pulses control the transfer of the digits registered in RR to the correct column in the marker FM and the R pulses initiate the resetting of the register RR after each binary digit level has been scanned.

As the account number on each frame is recorded in the frame marker FM, the thousands digit recorded therein is compared in the control circuit CC with the thousands digit encoded on the check jacket 1 and recorded in the jacket numeral marker JNM. The control circuit CC comprises thousands, hundreds, tens and units comparing or "found" tubes TH, HU, TN and UN. When the first account card frame is reached with the thousands digit corresponding to that of the account number of the jacketed check being processed, the "thousands found" tube TH is fired on the arrival of the next B pulse, and causes the deenergization of a speed relay HSR which at contacts HSR1 removes a shunt from a resistance R1 in the circuit of a speed clutch MC interposed between the motor 14 and the projector 15, thereby causing the projector to run at medium speed. The control circuit CC now compares the "hundreds" digits registered in the jacket marker JNM with those successively registered in the frame marker FM as the film continues to move at medium speed. When correspondence exists, and the next B pulse arrives, the "hundreds found" tube HU is fired, speed relay MSR is deenergized, and a shunt is removed also from resistance R2 in the circuit of the speed clutch MC, causing the projector to be run at low speed. The tens digits registered are now compared and when correspondence exists, the "tens found" tube TN fires and deenergizes relay LSR which inserts a further resistance R3 in circuit with the clutch MC, to cause the projector to be driven at slow speed. When correspondence exists between the units digit encoded on the check jacket 1 and the units digit encoded on the film frame being scanned (and, therefore, when correspondence exists between the two complete account numbers) the "units found" tube UN fires on the next B pulse, and energizes a relay UR which closes the circuit of a magnetic brake BC, operable on the drive shaft between the motor 14 and the projector 15. The projector drive is thus arrested and the frame of the selected account card will be projected on the viewing screen to permit signature comparison by the operator.

A more detailed description of the system and its operation will now be given with reference to Figs. 2 to 14 of the drawings, the equipment being described concurrently with an explanation of the operation of the system.

The customer's account cards may be in the form shown in Fig. 2. Each card bears the signature of the bank customer, a three digit number (020) representing the number of the bank branch and a four digit number (4638) representing the customer's account number in the bank. On the top right-hand corner of the card five horizontal lines of holes or circles are prepunched or blacked-in to correspond with the customer's account number in binary code. The binary code is shown in Fig. 3 it being noted that each digit is separately converted into its binary form in the first four rows of holes, the fifth row being used to denote a "stop" signal which is used to re-set certain of the electrical equipment as will be explained later. A fifth hole at the left-hand side of each binary level is used to generate counting pulses as will be more fully described in the description of the operation of the system.

The card when completed, is placed atop a black background against a right-angle stop on a table rigidly fixed to a microfilm camera, and is photographed on a 16 mm. film. The card is thus reduced to 1/10 of its original size permitting more than 3600 signature cards to be accommodated on a 100 foot roll of film. With the cards photographed in ascending numerical order of account number, a particular frame may be found and projected by means of an electronic frame finder which will be described later. Fig. 4 shows a section of the film the arrow indicating its direction of travel in the projector. The film, being a negative, will be transparent where the original card showed black, hence projected light through a lens will enlarge the image and pass through these transparent areas to activate five photocells P1 . . . P5 mounted in a row to constitute a five channel readout head.

The checks to be processed are enclosed in individual transparent plastic holders or jackets 1, Fig. 5, along the top edge of which is applied a magnetic metal strip 2 encoded with the customer's account number in the same binary code as indicated in Figs. 3 and 7. Adjacent the code track is encoded a counter track for generating counting and control pulses used in the operation of the electronic equipment. In applying the encoded indicia, the code track is magnetized to saturated negative polarity by a D. C. controlled head, and the counter track neutralized by an A. C. controlled head, both preceding the magnetic writing heads. The encoding may be controlled by a keyboard so that the code writing head magnetizes the strip to positive polarity saturation for each "1" bit leaving saturated negative polarity for each "0" bit. Following the "units" digit code there is applied a "stop" code consisting of 4 positive bits. The code counter writing head magnetizes to saturation one bit of opposite polarity for each succeeding bit on the binary code track (see Fig. 7). The manner in which the strip 2 is magnetically encoded forms no part of the present invention and will not be further described since equipment for this purpose is well-known in the art.

Reverting to a consideration of Fig. 5, a batch of encoded jackets 1 containing checks to be processed for signature comparison, is stacked on a platform 3 and held by pressure of one or more springs 4 so that the front jacket engages a pair of guides 5. A film projector is enclosed in a housing box 6 provided at its front end with a viewing screen 7 disposed above and to the left of the jacket platform 3. A pair of read-out heads 8 are mounted so as to scan the magnetized strip 2 on a jacket 1 as it is moved from the stacked position to the inspection position beneath the viewing screen 7 in the following manner. A key or push button 9 on the operator's desk, when thrown, closes circuits for two solenoid magnets 10, 11. Solenoid 10 is arranged to rotate on arm 12 the edge of which engages the edge of the first check jacket 1 in the stacked position and pushes this jacket in the guides 5 past the read-out heads 8 to the inspection position. Solenoid 11 at the same time withdraws a stop member 13 from the path of the jacket previously in the inspection position and permits it to be ejected and replaced by the new check jacket.

Figure 6:
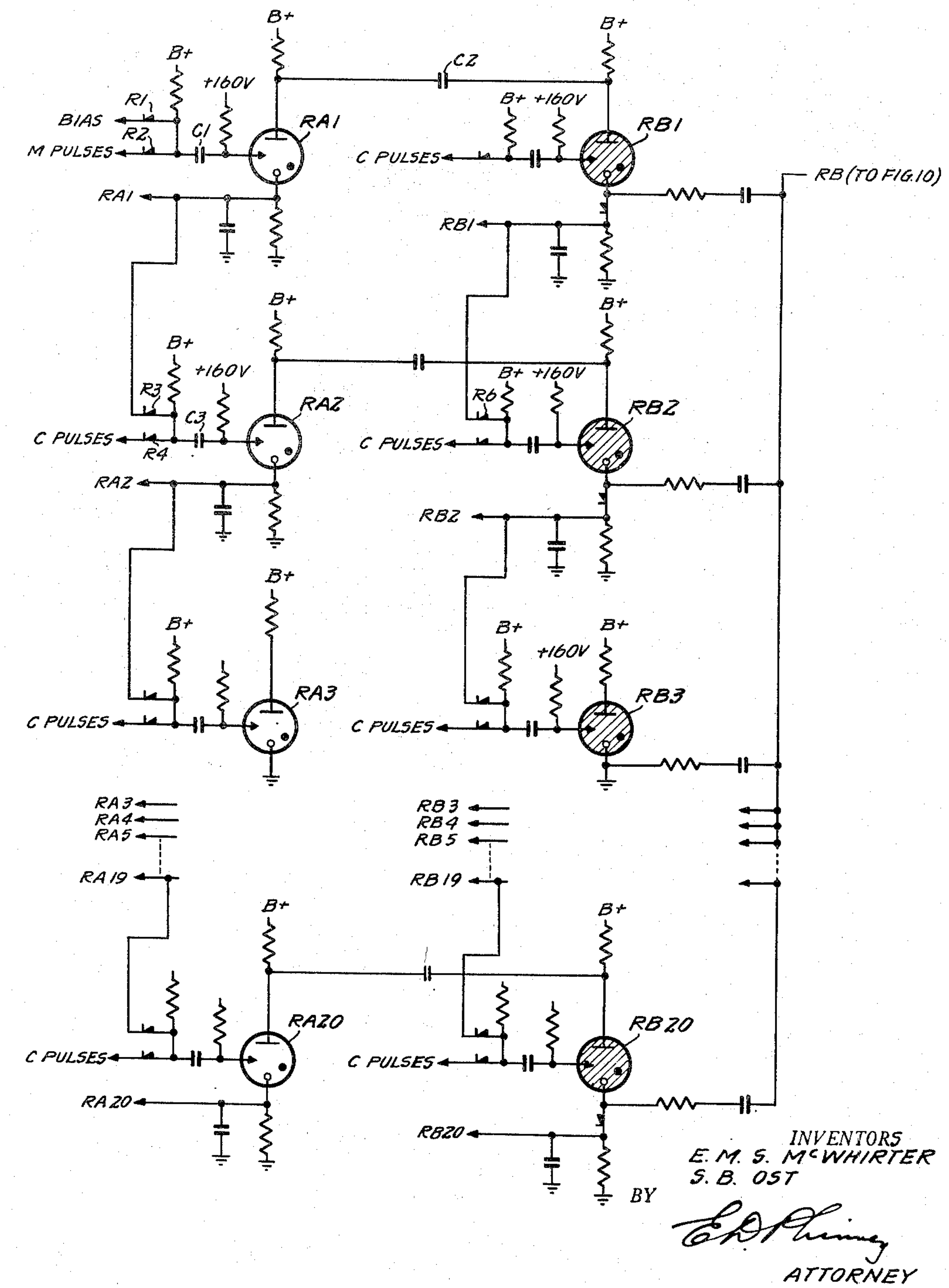
Fig. 6 is a circuit diagram of a shifting register.

*Jacket register, Fig. 6*

The circuit of the jacket register is shown in Fig. 6 and consists of two banks each of 20 quick-acting gas tubes which may be of the type disclosed in U. S. Patent No. 2,631,261 issued March 10, 1953. One bank comprises tubes RA1, RA2 . . . RA20, and the other tubes RB1, RB2 . . . RB20. The positive and negative bias signals P and N derived from the code track read off from the check jacket, and the change-over pulses C and mid code element pulses M derived from the counter track on the jacket (see Fig. 7) are applied to the trigger electrodes of the gas tubes RA and RB as indicated in the drawing. Fig. 8 is a chart showing the condition of the register of Fig. 6 during each of the 16 time intervals during the reading of the first two digits (i. e. 4 thousand and 6 hundreds) of the account number of the check in the jacket which is being processed. The vertical columns indicate the RA and RB tubes in the fired condition, all the RB tubes being fired except when an RA tube is indicated as conducting.

The numbers as read by the head are shifted in the register in the following manner. All the tubes RB are fired at the end of processing of the preceding check. In interval 1 the first change-over pulse C, which is coincident with negative (N) bias, has no effect on the RA2, RA3 . . . RA20 or any of the tubes RB. In interval 2, the mid-pulse M with negative bias N has no effect on tube RA1. In intervals 3 and 4 the C and M pulses likewise do nothing, and in interval 5 the C pulse is without effect on the RA2, RA3 . . . RA20 and the RB tubes, and the positive bias (P) is without effect on tube RA1. Not until an M pulse at the center of a code signal and the positive bias P are coincidentally applied to tube RA1 in interval 6 does anything happen. At this time both rectifier R1 and R2 are blocked and a positive pulse is supplied over condenser C1 to the trigger of RA1 which with the fixed bias is sufficient to fire this tube. The resultant change of anode potential extinguishes tube RB1 over condenser C2, and bias RA1 blocks rectifier R3 which is connected over a condenser C3 to the trigger RA2. The next C pulse in interval 7 blocks rectifier R4 also, whereupon tube RA2 fires and extinguishes tube RB2. This C pulse also fires RB1 which douses RA1. No action takes place during the next M pulse in interval 8, at the end of which RB4, RB3, RA2, and RB1 are fired representing 0010, the four bits of the binary code for thousands number 4. The next C pulse in interval 9 ignites RA3 (since rectifier R5 is blocked by RA2) which douses RB3. This C pulse also fires RB2 since rectifier R6 is blocked by bias RB1. Nothing then happens until interval 11 when the next change-over pulse C fires RA4 and RB3. Tube RA4 douses RB4. In interval 12, the coincidence of positive bias P and the mid-pulse M again fires RA1 which douses RB1. The next C pulse in interval 13, fires RB1 which douses RA1 and fires RA2 which douses RB2. It also fires RB4 which douses RA4 and fires RA5 which douses RB5. The next M pulse coincident with positive bias P in interval 14 again fires RA1 which douses RB1. The next C pulse in interval 15 fires RB1 which douses RA1, fires RA3 which douses RB3, and fires RA6 which douses RB6. This C pulse also fires RB5 which douses RA5. The pulse M in interval 16 does nothing and in this interval the register reads RB8, RB7, RA6, RB5 (0010) and RB4, RA3, RA2, RB1 (0110). Thus the thousands number 4 in the register has been shifted to make way for the hundreds number 6. The tens and units digits and the stop signal (1111) are recorded in the register in the same manner, the records being shifted down until the stop signal is read as RA1, RA2, RA3, RA4.

Figure 9:
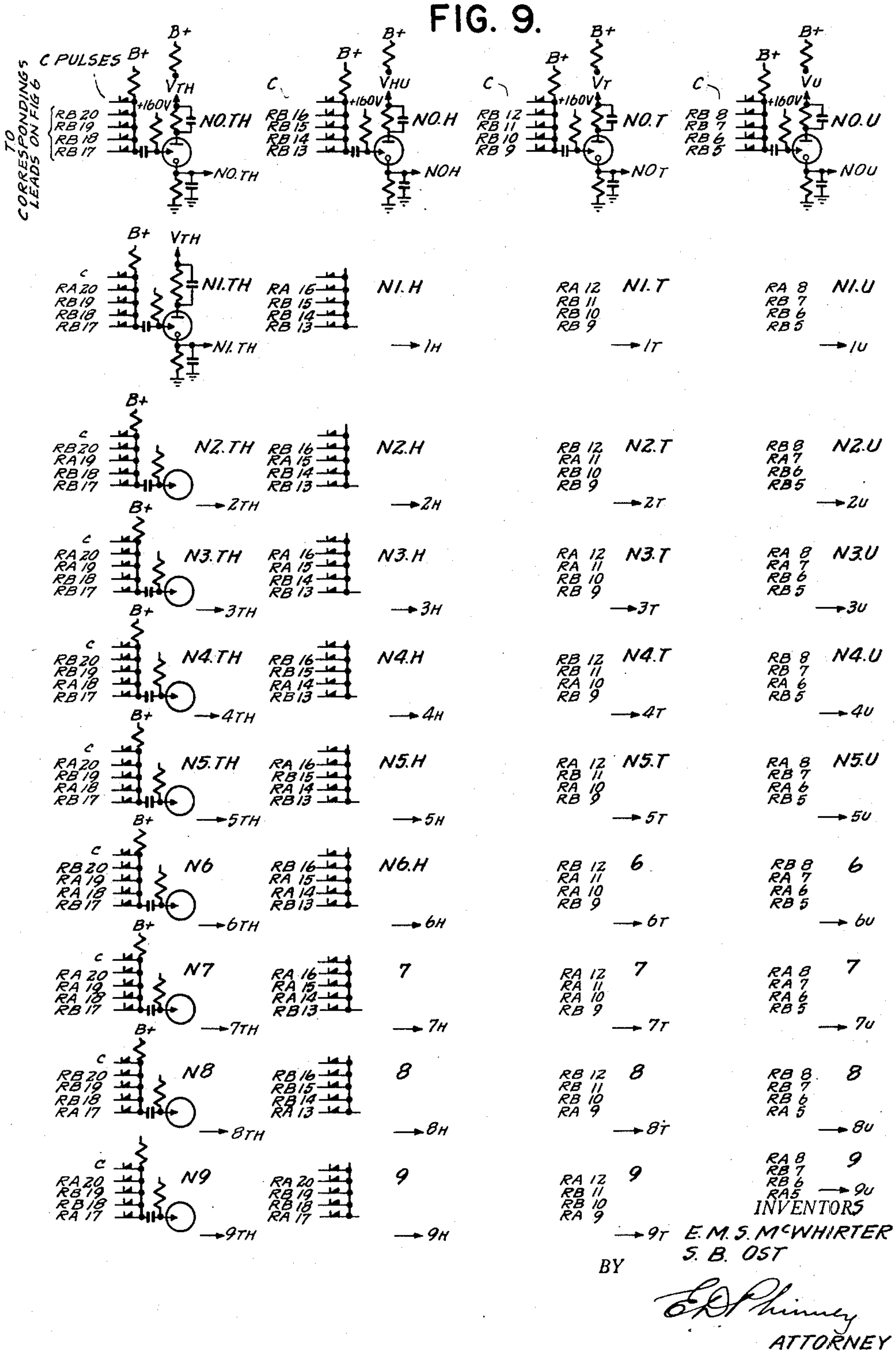
Fig. 9 is a circuit diagram of a jacket numerical marker in which the customer's account number as read-off from the check jacket is recorded.

*Jacket numerical marker, Fig. 9*

This comprises 4 columns of 10 gas tubes N0.TH, N0.H, N0.T, N0.U for marking out the thousands, hundreds, tens and units figures of the account number encoded on the check jacket in accordance with the decimal code. For this purpose the outputs RA1, RB1, etc., of the tubes of the shifting register, Fig. 6, are jumpered in the appropriate code combinations to the corresponding input trigger leads of the marker tubes of Fig. 9, these leads being connected in parallel over blocking rectifiers to the respective trigger electrodes via condensers in known manner. With all the RB tubes of the shifting register of Fig. 6 fired due to the resetting pulse RB derived from processing the preceding check, tubes N0.TH, N0.H, N0.T, N0.U are fired and the marker of Fig. 9 is reset to zero on the arrival of the first change-over pulse C derived from the incoming check to be processed. The common B+ anode potential source for each digit column of tubes is connected over $V_{th}$, $V_{hu}$, $V_t$, $V_u$ and respective anode circuit resistors to the anodes of all the tubes of the respective columns, so that when a zero tube such as N0.TH fires the anodes of all the other tubes in the thousands column go more negative and any tube which was conducting due to the processing of the preceding jacket is doused. This same applies to all the tubes in the hundreds, tens and unit columns.

While the information from the code track on the check jacket is being received by the shifting register, Fig. 6, as previously described, the gas tubes of the latter are (over the outputs RA1, RB1, etc.) biasing the appropriate numerical tubes of the marker of Fig. 9, causing the numbers to step through this marker. The 4 of the thousands digit first appears in the units column, the tube N4.U being fired on the arrival of the next C pulse when the shifting register reads RB8, RB7, RA6, RB5. As further numbers arrive in the register the first number (4) steps through the marker, appearing first in the units column, then in the tens column, the hundreds column and the thousands column. The succeeding incoming numbers do likewise until 4 is in the thousands column (N4.TH fired), 6 in the hundreds column (N6.4 fired), 3 in the tens column (N3.T fired) and 8 is in the units column (N8.T fired). At this time the stop signal (1111—RA1, RA2, RA3, RA4) is in the 1, 2, 3, 4 (first) section of the register, a C pulse is coincident and the specimen signature film is started advancing in the following manner. The marker now holds in its set position while the film is scanned to find the frame with the corresponding account number.

Figure 10:
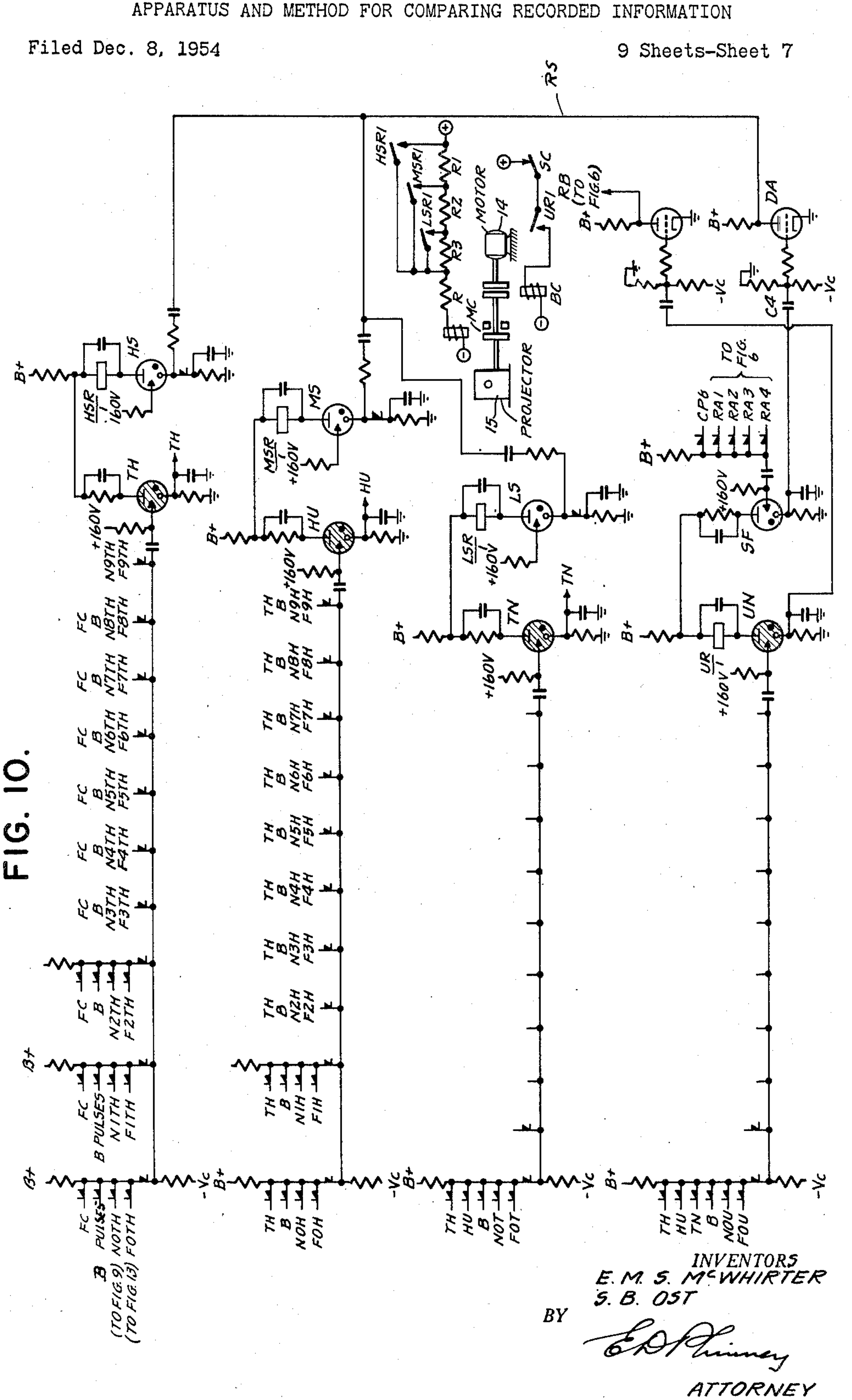
Fig. 10 is a circuit diagram of a film speed and stop control circuit.

*Film control mechanism and circuit, Fig. 10*

The outlets from RA1, RA2, RA3, RA4, Fig. 6 are jumpered in parallel over blocking rectifiers to the trigger of tube SF, Fig. 10, which fires when coincidence exists with a change-over C pulse, and SF douses tube UN.

The firing of tube SF also applies a positive voltage to a conductor connected to its cathode. This voltage is applied over a condenser C4 to the grid of a three-electrode thermionic tube DA. The tube DA is normally biassed to cut-off and when the positive voltage arrives at its grid, the tube conducts and its plate goes negative and stays negative for a time depending on the resistance and capacity (the RC) of its grid circuit. This time is made short so that a negative pulse of about 50 μsec. appears on the output lead RS, which is fed to the cathode of the speed control tubes LS, MS and HS to fire them. The speed control tubes LS, MS and HS in turn douse tubes TN, HU, TH, UN. The function of tubes UN, TN, HU and TH is to cause the units, tens, hundreds and thousands digits of the account numbers of the signature cards photographed on the film to be scanned in turn at successively slower speeds and these tubes were brought to their fired condition in the processing of the preceding jacketed check.

When tube UN was doused, relay UR in its anode circuit was deenergized and contacts UR1 opened the circuit of a magnet BC which controls a magnetic brake clutch acting on the driving shaft between an electric motor 14 and the film projector 15. The magnetic clutch may be of any known type. Tubes LS, MS and HS have connected respectively in their anode circuits relays LSR, MSR, HSR, contacts of which are arranged to short-circuit resistors R3, R2, R1 connected in the energizing circuit of a speed clutch MC for varying the speed at which the motor 14 drives the projector 15. The speed clutch may consist of a known form of fluid magnetic clutch inserted in the drive between the motor and projector. With this type of clutch the motor will turn the shaft driving the projector at a different speed dependent upon the flux linkage in the clutch MC which in turn is controlled by the amount of current passing through its winding.

As already stated, when the shifting register of Fig. 6 records a stop signal, speed tubes LS, MS, HS, Fig. 10, fire, short-circuits are removed from resistors R1, R2, R3 at contacts LSR1, MSR1, HSR1 and the film in the projector 15 is driven at high speed by the motor 14.

*Film readout register, Fig. 11*

Four photo-electric cells P1 to P4 (see Figs. 4 and 11) are mounted to receive light projected through the code track on the film onto an enlarged reading surface. A fifth photocell P5 (see Fig. 4) is aligned with the projection of the counter track. The outputs of the photocells P1 to P4 are respectively connected to the trigger leads of four gas tubes FA1 . . . FA4, Fig. 11, forming part of the film readout register.

The output from the counter track photocell P5 is fed to an amplifier A3 (see Fig. 1), a flip-flop circuit FF3, a multivibrator MV3 and a pulse forming circuit RC3 to obtain three sets of pulses A, B and R of 100 $\mu$sec. duration, of the wave form shown in Fig. 12. Such circuits are well known in the electrical art and it is unnecessary to describe them here in detail. Referring to diagram (*c*) of Fig. 12, the pulses A occur 500 $\mu$sec. after the leading edges of the track and the B pulses 1000 $\mu$sec. after the A pulses. The R pulses occur 500 $\mu$sec. after the trailing edges of the tracks.

The film readout register of Fig. 11 comprises two banks of 4 gas tubes FA1, FA2, etc., and FB1, FB2, etc., connected in circuits substantially similar to those of the tubes of Fig. 6. The tubes FB1, FB2 are normally in a fired condition. When light impinges on one of the photocells P1 . . . P4 this cell conducts and the potential on the trigger electrode of the corresponding tube FA1 . . . FA4 is raised to cause the tube to fire. The tube FA1, FA2, etc., in its conducting condition lowers the anode potential of the corresponding tube FB1, FB2, etc., causing it to douse. The R pulses are directed to the rigger electrodes of the tube FB1, FB2, etc., and cause any which have been doused to be refired after each 4 parallel bit digit code has been scanned by the photocells P1 to P4.

Assuming that the thousands number of the first frame which is scanned by the photocells P1 . . . P4 is 3 then FA1, FA2, FB3, FB4 will be fired.

Figure 13:
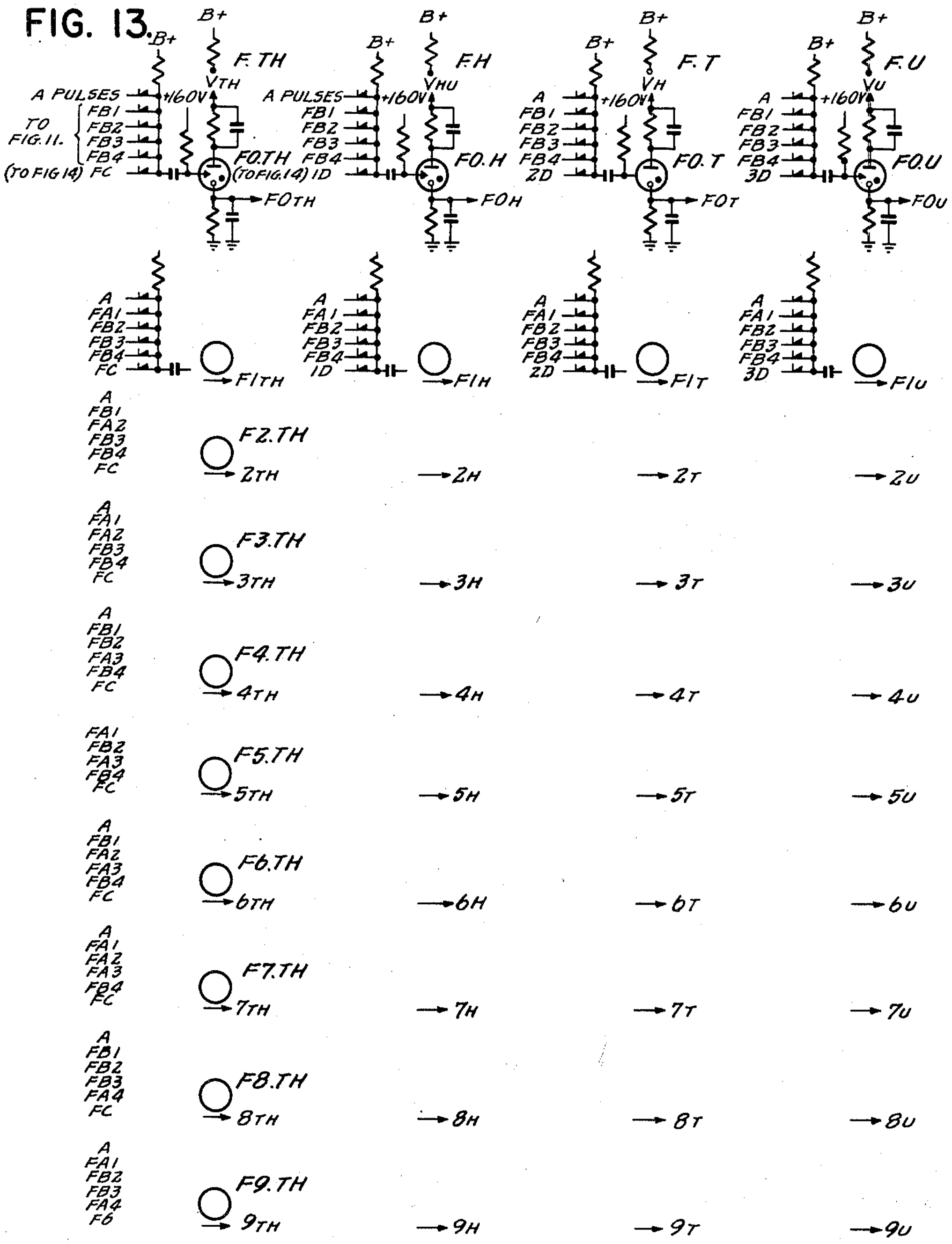
Fig. 13 is a circuit diagram of a frame marker which records the account numbers on the customer's account cards photographed on the film as the film is run through the projector.

*Frame marker, Fig. 13*

This comprises 4 banks of 10 gas tubes F.TH, F.H, F.T, F.U, respectively, for the thousands, hundreds, tens, and units numbers, the circuits of these tubes being similar in arrangement and operation to those of the tubes in Fig. 9. The outputs of the tubes FA1 . . . FA4, FB1 . . . FB4 of the film readout register, Fig. 11, are jumpered in appropriate code combinations to the trigger lead of thousands, hundreds, etc., tube banks F.TH, F.H, etc., of the frame marker, Fig. 13. The A pulse derived from the counter track on the film are fed to trigger leads of each of the tubes F.TH, F.H, etc., of the frame marker. The thousands, hundreds, tens and units tube banks of this marker are successively conditioned by the control and digit tubes FC, 1D, 2D, 3D, 4D of the marker control circuit, Fig. 14, so that as the photocells P1 . . . P4 scan the code track on the film, each 4 bit code recorded in the readout register, Fig. 11, will be put in the correct bank or column in decimal form.

Figure 14:
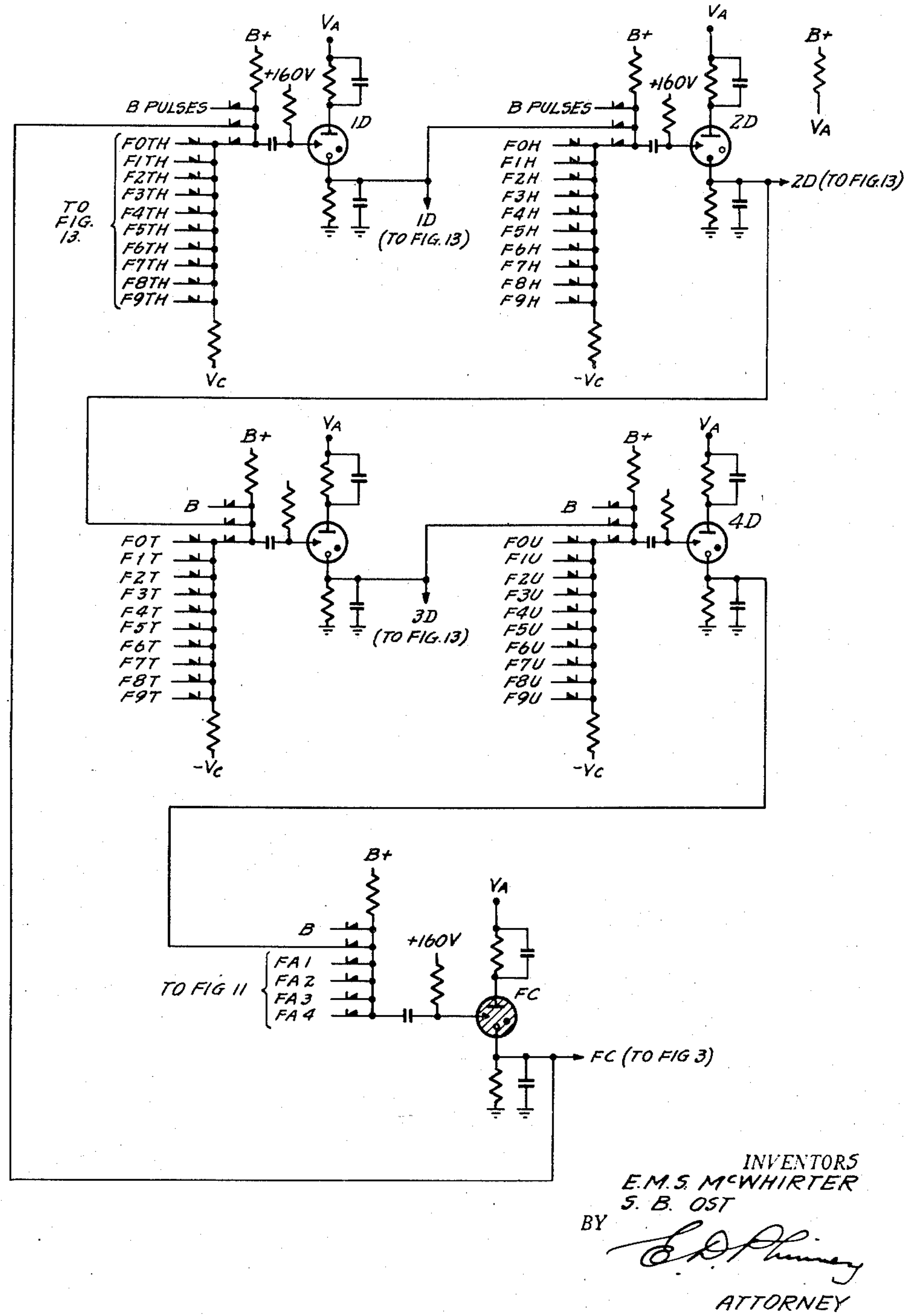
Fig. 14 is a circuit diagram of a control circuit associated with the frame marker of Fig. 13.

Referring to Fig. 14, the tube FC was fired by the stop signal, bias from tube 4D, and the coincident B pulse from the scanning of the preceding frame, and bias from this tube FC applied to the trigger leads of the thousands tubes F.TH of the frame marker conditions them for operation. When, therefore, the A pulse is derived from the counter track, the appropriate thousands digit tube F3.TH is fired since there is coincidental bias on leads A, FA1, FA2, FB3, FB4 and FC. On the next B pulse from the counter track, the tube 1D of the control circuit of Fig. 14 fires, since it is coincident with bias FC and bias from one of the thousands tubes F.TH. Bias from the 1D conditions the hundreds tubes F.H of the frame marker for operation, and on the next A pulse the appropriate hundreds tube is fired. On the next B pulse tube 2D of the control circuit fires and the tens bank F.T is made ready to record the tens digit. The units digit is recorded in the same manner in the units bank F.U after the control tube 3D is fired by the next B pulse. The succeeding B pulse fires the control tube 4D and when the stop signal is received coincident with the next A pulse the tube FC is re-fired.

It may be well to state that at this time the digits of the account number encoded on the jacket containing the check which is being processed, is recorded in the jacket marker of Fig. 9, and the account number on the film frame at this time passing through the projector gate is recorded in the frame marker of Fig. 13. The "thousands found" tube TH of Fig. 10 now makes a check of one with the other of the thousands digit recorded in these two markers. The biases derived from the cathode resistors of corresponding tubes (e. g. F.TH and N.TH0 of the respective markers, are applied in parallel pairs over blocking rectifiers to the triggers of the thousands, hundreds, tens and units found tubes TH, HU, TN, UN, Fig. 10. In the thousands tube TH, for example, each parallel pair is connected in parallel with a B pulse lead and bias from tube FC, and this group of four leads is connected over a separating rectifier to the trigger of tube TH. The hundreds, tens and units found tubes HU, TN, UN are similarly connected except that these tubes are conditioned by bias from the preceding tube TH, HU or TN instead of from tube FC.

If the thousands digit recorded in the frame marker, Fig. 13, differs from the thousands digit in the jacket marker, Fig. 9, and is for example 3, nothing happens excepting tube F3TH is fired and the film will continue to run at high speed until the frame containing account number 4000 is reached. It will be noted that so long as the thousands digit of the scanned frame is 3 the A pulse coincident with FA1, FA2, FB3, FB4 and FC finds tube F3TH already fired. When the thousands #4 is read out from the register of Fig. 11 into the frame marker of Fig. 13, tube F4TH will fire and will douse tube F3TH. Being coincident with the firing of tube N4TH in the numerical jacket marker of Fig. 9, the B pulse will bring up the "thousands found" tube TH, Fig. 10, which will douse the high speed tube HS thereby dropping the high speed relay HSR and removing the shunt from resistance R1 in the circuit of the speed clutch MC to cause the film to travel at medium speed. This same B pulse will bring up the first digit tube 1D in the control circuit, F. 14, which douses tube FC. The film will not continue to move at medium speed until the frame containing account number 4600 is reached. With biases F6H coincident with N6H and bias TH, the B pulse will bring up the "hundreds found" tube HU which douses tube MS thereby dropping relay MSR which at contacts MSR1 removes a shunt from resistor R2, and causes the film to travel at low speed. This same B pulse will bring up the second digit tube 2D which douses 1D. The film will continue to move at low speed until the frame containing account number 4630 is reached. When tens digit #3 is read out from the frame register, bias F3T will be applied coincident with bias N3T and biases TH, HU and the next B pulse will cause the "tens found" tube TN to fire and douse the low speed tube LS, thus dropping relay LSR which at contacts LSR1 removes the shunt from resistor R3 and causes the film to travel at slow speed. This same B pulse will bring up the third digit tube 3D which douses 2D. The film will continue to move at slow speed for 8 frames or until the frame containing account #4638 is reached. When units digit #8 is read out from the frame register, bias F8U is applied coincident with biases N8U, TH, HU, TN and the next B pulse will bring up the "units found" tube UN, douse the start film tube SF and bring up the relay UR. At contacts UR1 relay UR closes a circuit for the magnetic brake BC. The film will not stop at this exact moment, since the inertia of the driving system is sufficient to carry it forward for a short distance while the relay UR is coming up and the brake flux is building up. The final stop signal is, therefore, received in the readout register, Fig. 11, while the film is stopping and bias on the leads FA1 . . . FA4 and 4D coincident with the next B pulse ionizes tube FC in the control circuit, Fig. 14 which douses tube 4D, thus resetting this circuit ready for dealing with the processing of another jacketed check.

The firing of the "units found" tube UN also applies a positive voltage to a conductor connected to its cathode. This voltage is applied over a condenser C5 to the grid of a three-electrode thermionic tube D. The tube D is normally biased to cut-off and when the positive voltage arrives at its grid, the tube conducts and its plate goes negative and stays negative for a time depending upon the RC of its grid circuit. This time is made short so that a negative pulse of about 50 $\mu$sec. appears on the RB output lead, which is fed to the cathodes of all the RB tubes of the shifting register of Fig. 6 to fire those not already conducting, preparatory to the processing of the next jacketed check to be decoded.

The frame now found, which corresponds to the account number of the customer whose jacketed check is being processed, is projected onto the viewing screen 7, Fig. 5, where it may be viewed by the operator to enable signature comparison. If there is more than one signature for the account, these will have been microfilmed in succession on the filing. The equipment will find the frame of the first card for that particular account, but by actuating a scan key SC, Fig. 10, the operator is able to release the brake clutch BC and permit the film to be driven at very slow speed, so that he may observe the other signatures of that account as the film is advanced.

While the principles of the invention have been described above in connection with a specific application and embodiment, it will be understood that various modifications, substitutions and omissions in the form and operation may be made by those skilled in the art without departing from the spirit of the invention, and that the detailed description is made only by way of example and not as a limitation to the scope of the invention.

What we claim is:

1. Apparatus for correlating information contained on a document with a particular one of a multiplicity of similar records, comprising a holder for said document provided with coded indicia particular to information borne by said document, a film on which said records are sequentially recorded together with coded indicia particular to the respective records, a projector for said film including means for sequentially projecting said records on a screen, first sensing means for reading said coded indicia on said document holder, a first registering means actuated by said first sensing means for recording said last-mentioned indicia, second sensing means for scanning sequentially the coded indicia on said film, a second registering means actuated by said second sensing means for sequentially recording said coded indicia borne by said film, means for comparing the indicia recorded in said first registering means with the coded indicia recorded in turn in said second registering means and means for stopping said film projector when correspondence exists between the coded indicia recorded in said first and second registering means.

2. Apparatus for selecting automatically a particular record from a multiplicity of similar records comprising a controlling member provided with a magnetizable surface encoded with controlling indicia, a film on which is photographed a multiplicity of similar records together with coded indicia particular to the respective records, a projector for said film including means for sequentially projecting said records on a screen, a reading head for scanning the magnetically encoded indicia on said controlling member, a first registering means actuated by said reading head for recording said indicia, light sensitive means for scanning sequentially the coded indicia on said film, a second registering means actuated by said light sensitive means for sequentially recording said last-mentioned coded indicia, means for comparing the indicia recorded in said first registering means with the coded indicia recorded in turn in said registering means and means for stopping said film projector when correspondence exists between the indicia recorded in said first and second registering means.

3. Apparatus for enabling the correlation of information contained on a document with a particular one of a multiplicity of similar records, comprising a holder for said document provided with a track of magnetic material encoded with indicia particular to information borne by said document, a film on which is photographed a multiplicity of similar records together with coded indicia particular to the respective records, a projector including means for sequentially projecting said records on a screen from said film, a reading heading for scanning the magnetically encoded indicia on said holder, first registering means actuated by said reading head for recording said indicia, light sensitive means for scanning sequentially the coded indicia on said film, second registering means actuated by said light sensitive means for sequentially recording said last-mentioned coded indicia, means for comparing the indicia recorded in said first registering means with the coded indicia recorded in turn in said second registering means, and means for stopping said film projector when correspondence exists between the indicia recorded in said first and second registering means.

4. Apparatus according to claim 3, further comprising a second track of magnetizable material on said holder consisting of alternate portions magnetized to opposite polarities, a second reading head for scanning said second track, means for deriving electrical pulses from the output of said last-mentioned reading head, and means for utilizing said pulses for controlling the sequential operation of said first registering means.

5. Apparatus according to claim 3, comprising a further code track on said film, light sensitive means for scanning said further track, means for deriving electrical pulses from the output of said last-mentioned light-sensitive means, and means for utilizing said pulses for controlling the sequential operation of said second registering means and said comparing means.

6. Apparatus according to claim 3, further comprising a position on which is adapted to be loaded a stack of holders having a documents to be processed associated therewith, an inspection position, and means for transferring said holders one at a time from said first-mentioned position to said inspection position, said reading head being mounted in the path traversed by said magnetic track on a holder during such transfer operation.

7. Apparatus according to claim 3, wherein said holder is magnetically encoded with a stop signal and further comprising means for recording said stop signal in said first registering and means responsive thereto for closing a starting circuit for said film projector.

8. Apparatus for enabling the correlation of information contained on a document with a particular one of a multiplicity of similar records, comprising a holder for said document provided with a track of magnetic material encoded in binary notation with indicia particular to information borne by said document, a film on which is photographed on successive frames a multiplicity of similar records together with coded indicia in binary notation particular to the respective records, a projector including means for sequentially projecting said records on a screen from said film, a reading head for scanning the magnetically encoded indicia on said holder, a register for recording in binary form said coded indicia borne by said document holder, a numerical marker, means for transferring the record from said register to said numerical marker in decimal form, a read-out register for recording in binary form said coded indicia borne by said film, a frame marker, means for transferring the recorded digits from said read-out register to said frame marker in decimal form, comparing means for successively comparing the numbers respectively marked in said numerical marker and said frame marker as the film is advanced, and a control circuit actuated by said comparing means for stopping said projector when coincidence exists between said numbers.

9. Apparatus according to claim 8 wherein each film frame is encoded with a stop signal and further comprising means for recording said signal and means responsive thereto for restoring said control circuit to its normal condition preparatory to the processing of another document holder.

10. Apparatus according to claim 8, in which said coded indicia on said holder and on said film frames each represent a plurality of digits of a number and further comprising means in said comparing means for first comparing the highest order digits while said projector is running at high speed, means in said control circuit responsive to coincidence between said highest order digits for reducing the driving speed of said projector and for effecting circuit changes in said comparing means whereby the latter then compares the next lower digits whilst said projector is being driven at lower speed.

11. Apparatus according to claim 10 in which said control circuit comprises a relay for each of the digits of said number, means for controlling the condition of said relays responsive to coincidence between the corresponding digits marked respectively in said numerical marker and said frame marker, means for stopping said projector controlled by said relay corresponding to the units digit, and means for changing the driving speed of said projector controlled by the relays corresponding to higher order digits.

12. Apparatus according to claim 8, further comprising a second code track on said film, light-sensitive means for scanning said second track, means for deriving first, second and third sets of timed pulses from the output of said light sensitive means, means for utilizing said first set of pulses to control the sequential operation of said frame marker, means for utilizing said second set of pulses for controlling the sequential operation of said comparing means and means for utilizing said third set of pulses for resetting said read out register after the transfer of each digit to said frame marker.

13. Apparatus according to claim 8, further comprising a second track of magnetizable material on said holder consisting of differently magnetized alternate portions, a second reading head for scanning said second track, means for deriving first and second sets of timed pulses from the output of said second reading head, means for utilizing said first set of pulses for controlling the sequential operation of said register and numerical marker, and means for utilizing said second set of pulses for marking the arrival in the register of the mid point of each code element read off from said code track by the first reading head.

14. Apparatus for enabling the comparison of information contained on a document with a particular record selected from a multiplicity of similar records, comprising a holder for said document representing a number consisting of a plurality of digits and allocated to the individual or account to which said document pertains, a film on which is photographed a multiplicity of similar records respectively pertaining to a multiplicity of individuals or accounts representative of numbers allocated to such individuals or accounts, the records being photographed on said film in sequential order, a projector including means for sequentially projecting said records on a screen from said film, a reading head for scanning the magnetically encoded indicia on said holder, first registering means actuated by said reading head for recording the number represented by said indicia, light-sensitive means for scanning sequentially the coded indicia on said film, second registering means actuated by said light-sensitive means for sequentially recording the number represented by said last-mentioned coded indicia, means for comparing the highest order digit of the number recorded on said first registering means with the highest order digits of the number recorded in turn in said second registering means, and means controlled by said comparing means for reducing the speed at which the projector is driven when correspondence exists between the highest order recorded in said first and second registering means.

References Cited in the file of this patent

UNITED STATES PATENTS

| | | |
|---|---|---|
| 2,124,906 | Bryce | July 26, 1938 |
| 2,294,734 | Bryce | Sept. 1, 1942 |
| 2,482,242 | Brustman | Sept. 20, 1949 |
| 2,484,081 | Dickinson | Oct. 11, 1949 |
| 2,594,358 | Shaw | Apr. 29, 1952 |